United States Patent
Hemphill et al.

(10) Patent No.: US 7,987,958 B2
(45) Date of Patent: Aug. 2, 2011

(54) WEDGE ONE-WAY CLUTCH

(75) Inventors: Jeffrey Hemphill, Copley, OH (US);
Michael Davis, Wooster, OH (US);
William Brees, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 767 days.

(21) Appl. No.: 12/001,191

(22) Filed: Dec. 10, 2007

(65) Prior Publication Data

US 2008/0149448 A1 Jun. 26, 2008

Related U.S. Application Data

(60) Provisional application No. 60/876,424, filed on Dec. 21, 2006.

(51) Int. Cl.
*F16D 41/066* (2006.01)

(52) U.S. Cl. .......................... 192/45.1; 60/345

(58) Field of Classification Search .............. 192/45.1; 188/82.8; 60/345
See application file for complete search history.

(56) References Cited

U.S. PATENT DOCUMENTS

| | | | | |
|---|---|---|---|---|
| 684,478 A * | 10/1901 | Trimble | ........................ | 192/45.1 |
| 2,150,715 A * | 3/1939 | De Falco | ........................ | 192/45.1 |
| 3,009,747 A * | 11/1961 | Pitzer | ........................ | 384/272 |
| 3,202,251 A * | 8/1965 | Fulton | ........................ | 192/45.1 |
| 3,595,354 A * | 7/1971 | Charpentier | .................. | 192/45.1 |
| 3,865,219 A * | 2/1975 | Dossier | ........................ | 192/45.1 |
| 5,586,434 A * | 12/1996 | Okubo et al. | ................... | 60/345 |
| 6,953,112 B2 | 10/2005 | Miura | | |
| 7,040,469 B2 | 5/2006 | Shirataki et al. | | |
| 2003/0119616 A1* | 6/2003 | Meckstroth et al. | .......... | 474/135 |
| 2005/0199463 A1 | 9/2005 | Demura et al. | | |
| 2007/0284210 A1* | 12/2007 | Hemphill et al. | .............. | 192/46 |

FOREIGN PATENT DOCUMENTS

DE 907228 3/1954

* cited by examiner

*Primary Examiner* — Rodney H Bonck
(74) *Attorney, Agent, or Firm* — Simpson & Simpson, PLLC (57) ABSTRACT

A one-way clutch including first and second races with radially opposed circumferential surfaces and at least one wedge separate from the races and disposed radially between the races. The first race is arranged for rotational connection to a torque transmitting element in an automotive device and is arranged to rotate independently of the second race for relative rotation in a first direction. A circumference for one of the circumferential surfaces has a uniform radius. A circumference for the other of the circumferential surfaces includes at least one radial protrusion. The wedge elements are arranged to engage the protrusions and the opposing circumferential surface to rotationally lock the first and second races for relative rotation of the first race in a second rotational direction, opposite the first rotational direction. During lockup, a circumferential extent of the wedge elements in contact with the second race is greater than an axial extent.

23 Claims, 10 Drawing Sheets

WEDGE ONE-WAY CLUTCH

CROSS-REFERENCE TO RELATED APPLICATIONS

This application claims the benefit under 35 U.S.C. §119 (e) of U.S. Provisional Application No. 60/876,424 filed Dec. 21, 2006.

FIELD OF THE INVENTION

The invention relates to improvements in apparatus for transmitting force. The force can be between a rotary driving unit (such as the engine of a motor vehicle) and a rotary driven unit (such as the variable-speed transmission in the motor vehicle), or the force can be transmitted within a rotary driving unit (such as the transmission of a motor vehicle). In particular, the invention relates to a one-way clutch with wedges having a circumferential dimension greater than an axial dimension.

BACKGROUND OF THE INVENTION

Figure 1:
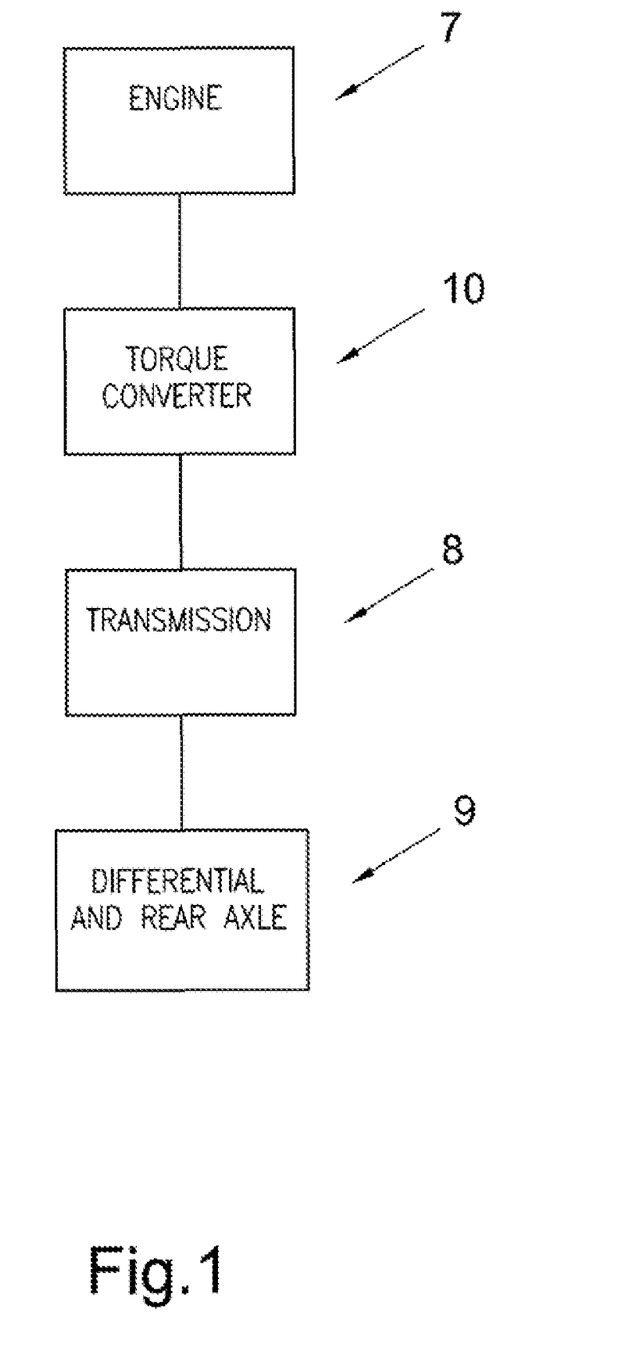
FIG. 1 is a general block diagram illustration of power flow in a motor vehicle, intended to help explain the relationship and function of a torque converter in the drive train thereof.

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

Figure 2:
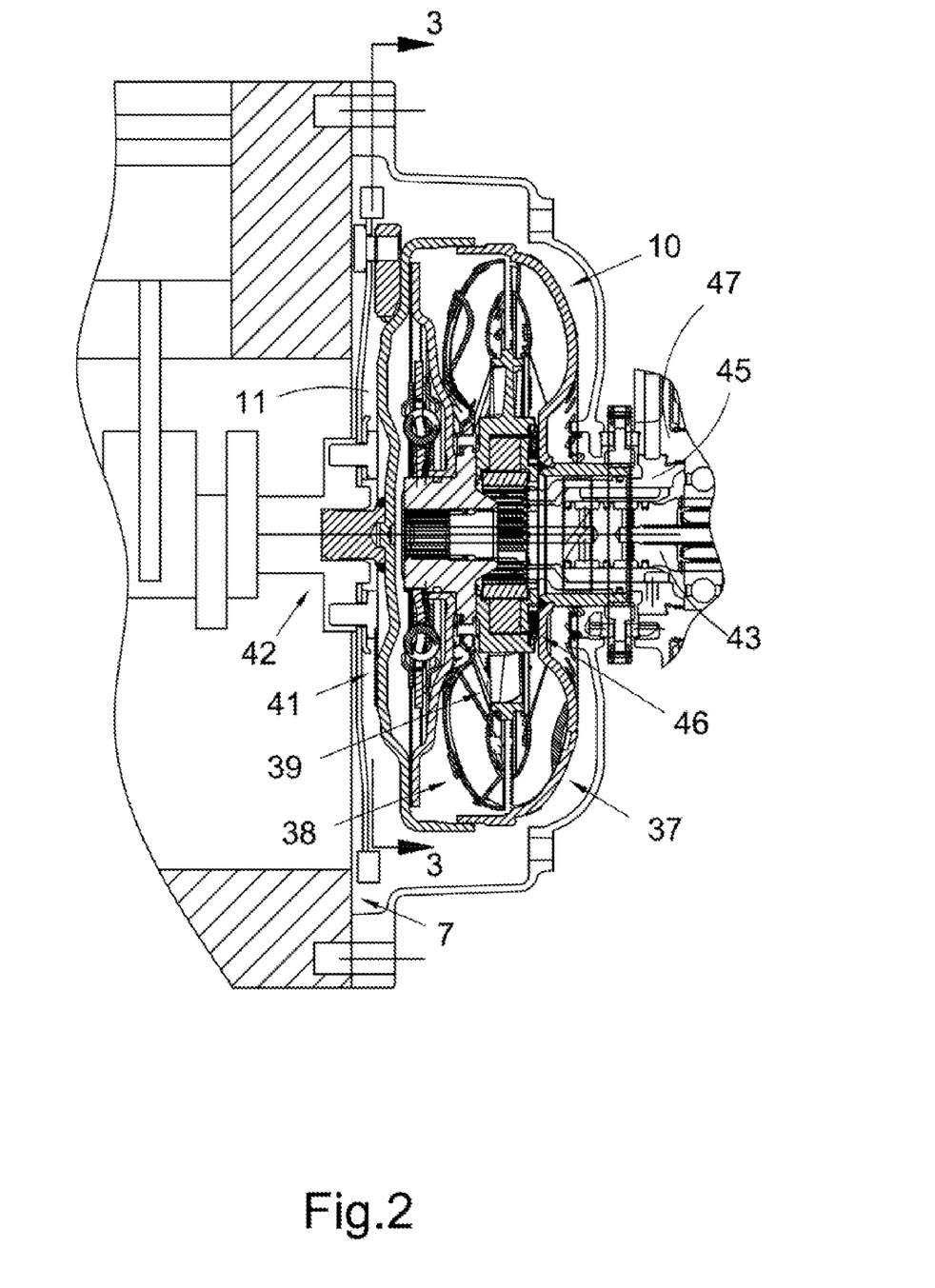
FIG. 2 is a cross-sectional view of a prior art torque converter, shown secured to an engine of a motor vehicle.
Figure 3:
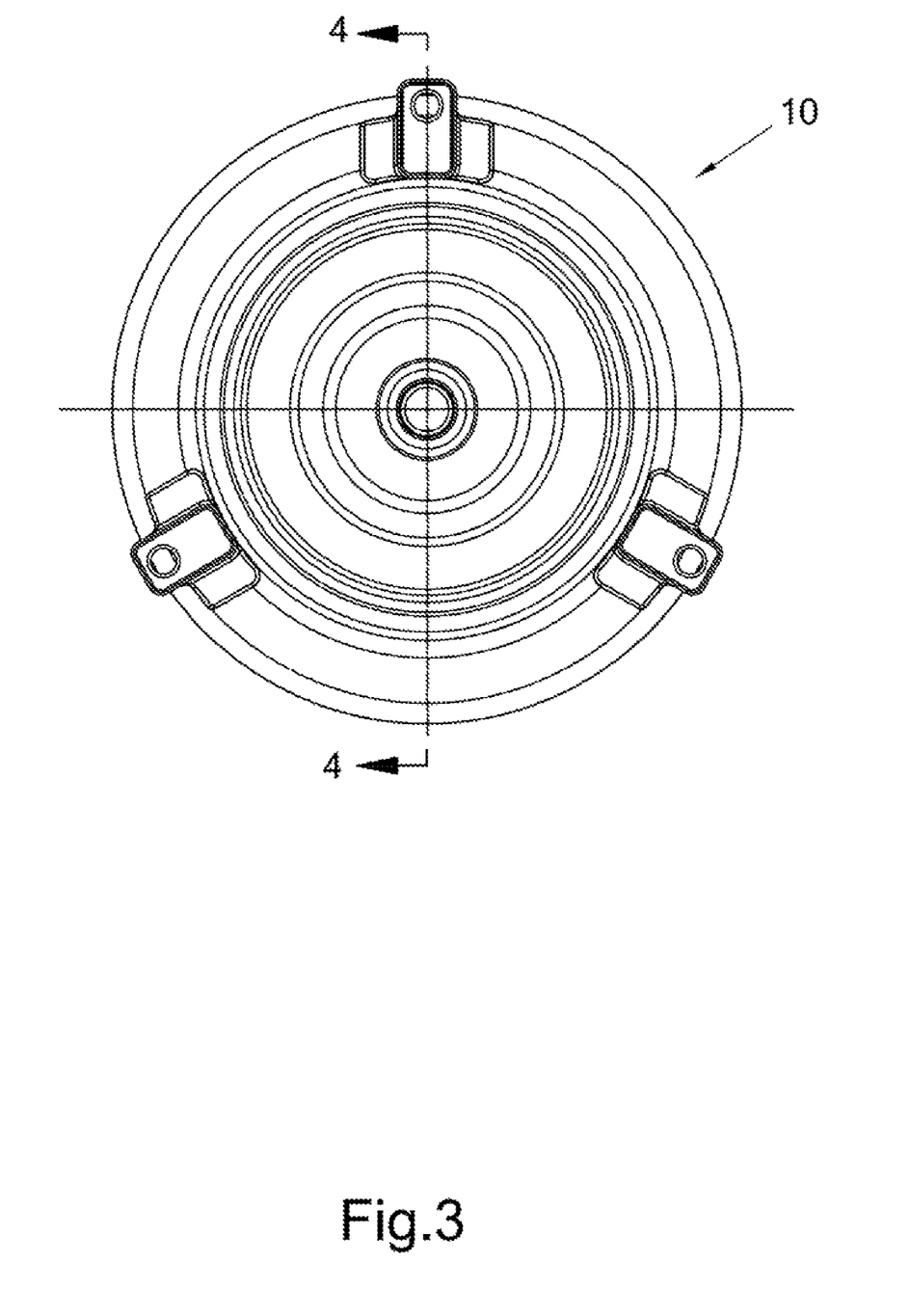
FIG. 3 is a left view of the torque converter shown in FIG. 2, taken generally along line 3-3 in FIG. 2.
Figure 4:
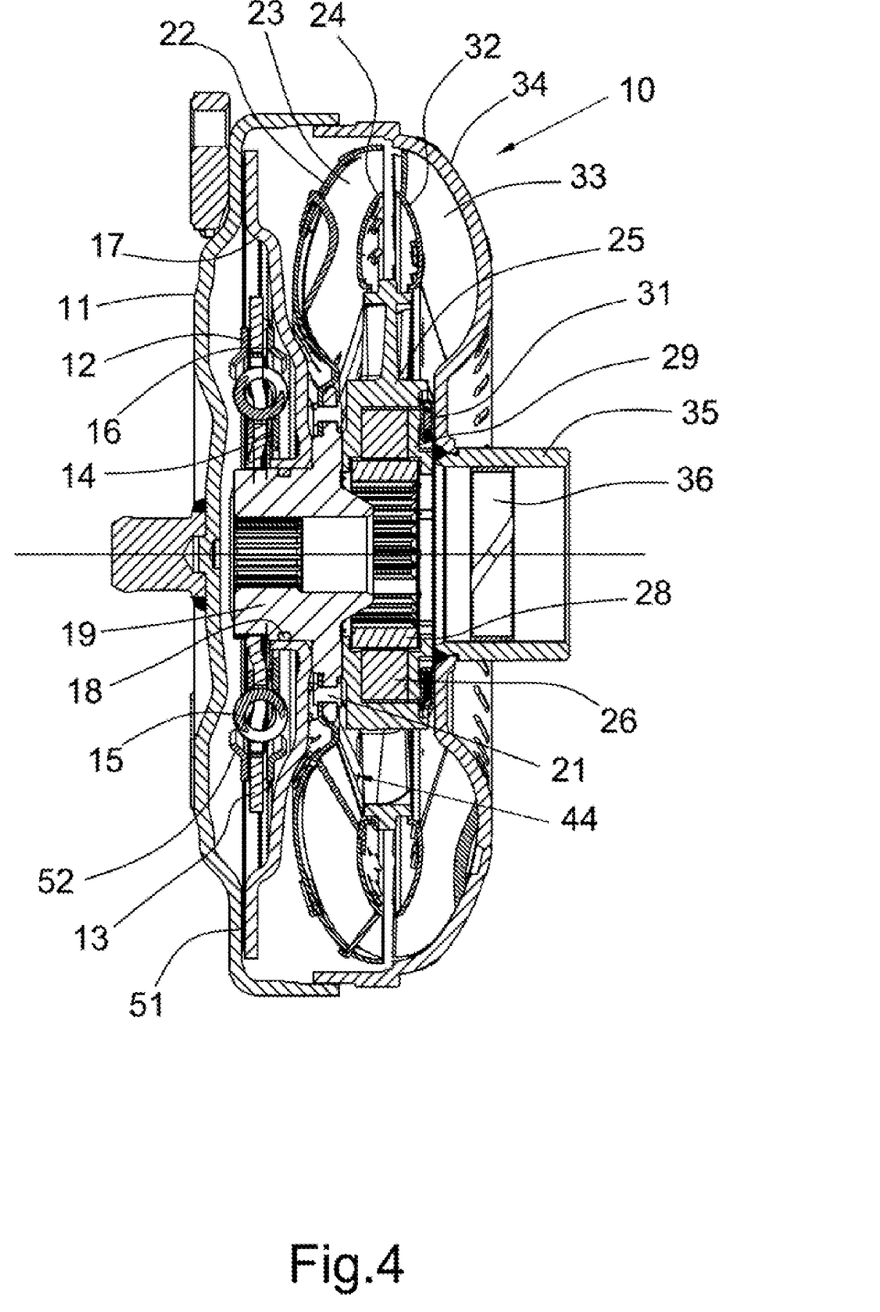
FIG. 4 is a cross-sectional view of the torque converter shown in FIGS. 2 and 3, taken generally along line 4-4 in FIG. 3.
Figure 5:
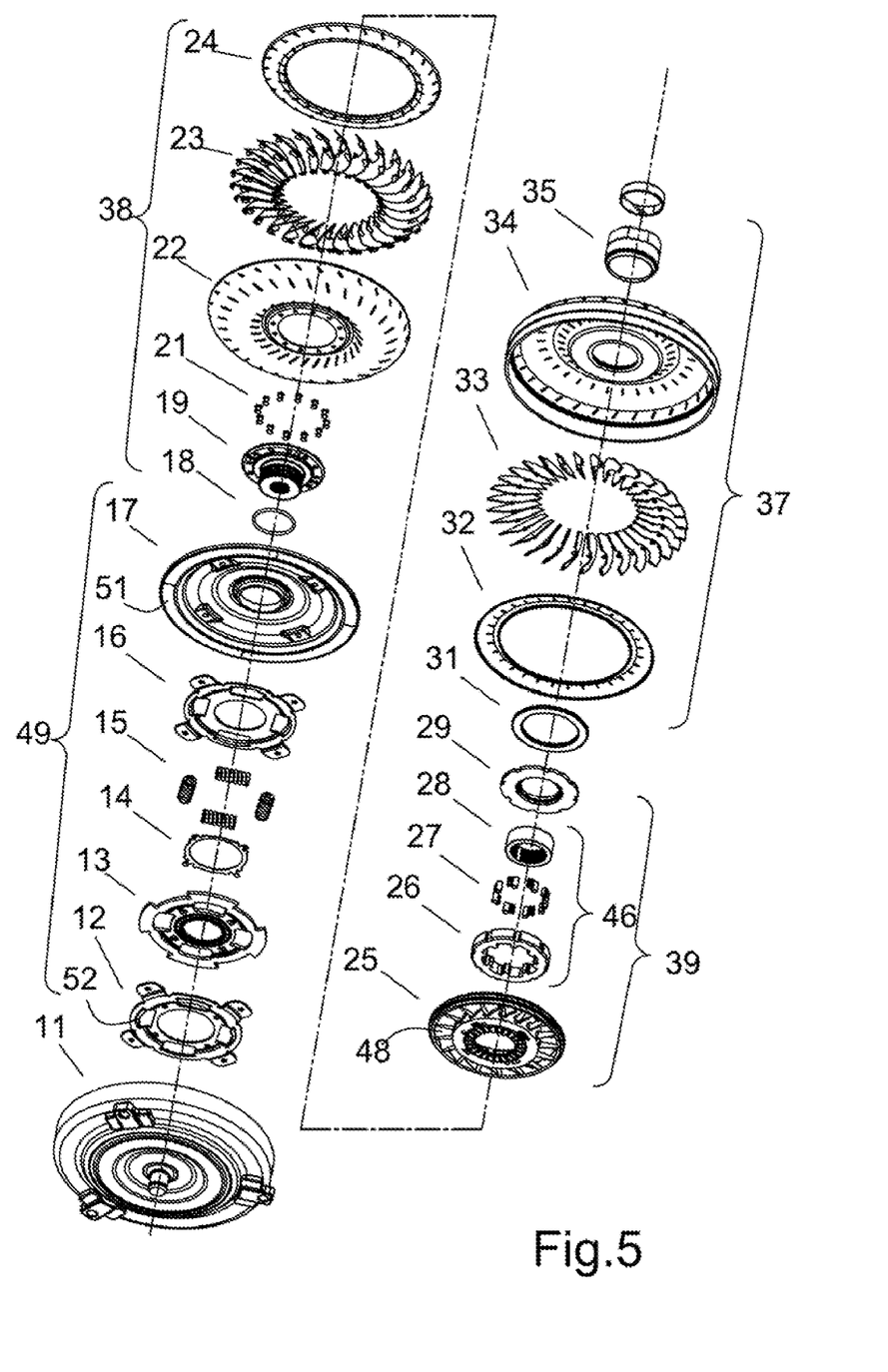
FIG. 5 is a first exploded view of the torque converter shown in FIG. 2, as shown from the perspective of one viewing the exploded torque converter from the left.
Figure 6:
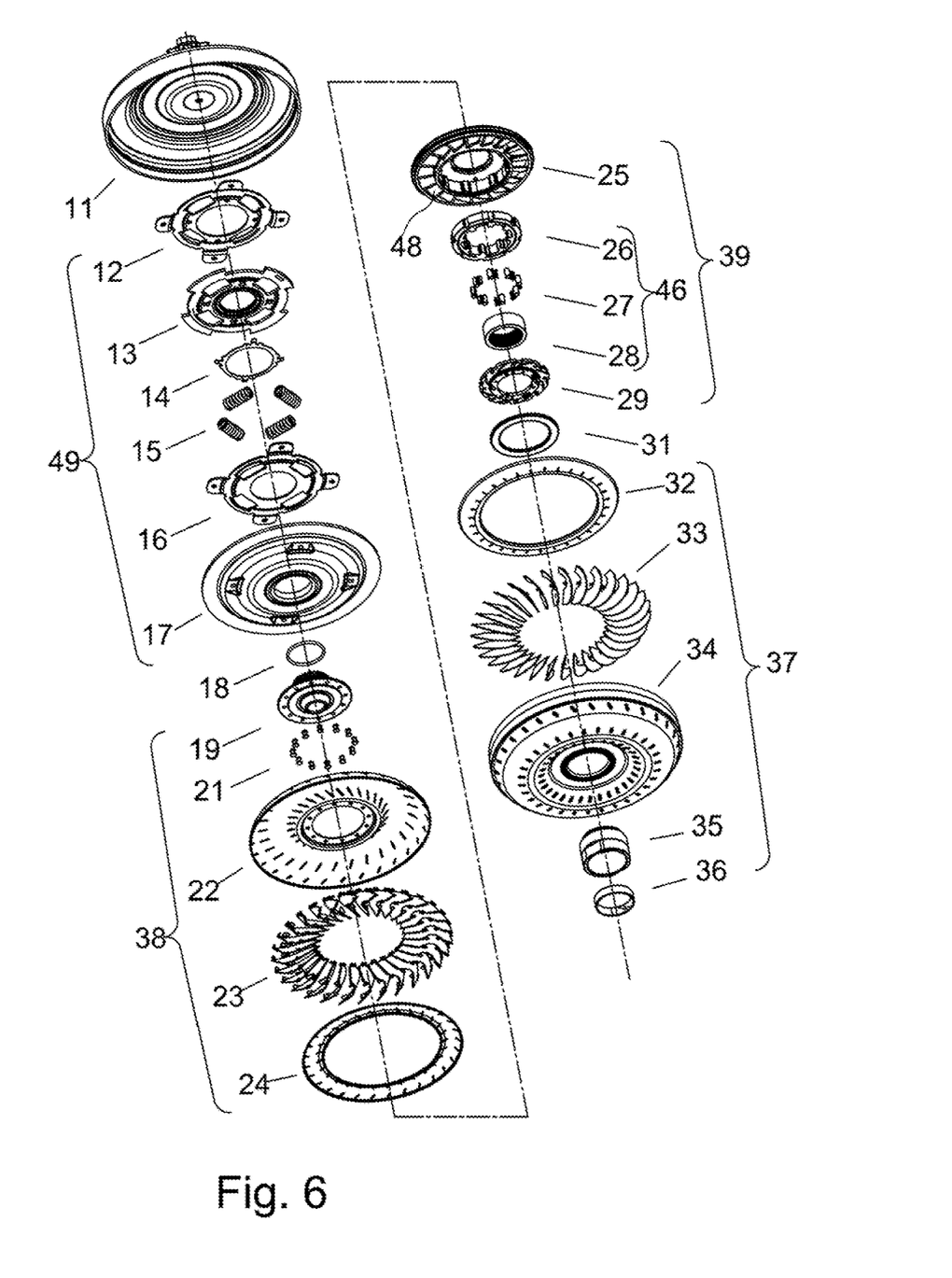
FIG. 6 is a second exploded view of the torque converter shown in FIG. 2, as shown from the perspective of one viewing the exploded torque converter from the right.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis.

Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

The use of roller clutches, such as clutch 46, also results in high stress due to the limited contact between the rollers in the clutch and the components radially bracketing the rollers. Therefore, the axial length of a roller clutch must be increased, undesirably increasing the axial space required for a component housing a roller clutch, for example, stator 39. U.S. Pat. No. 7,040,469 (Shirataki et al.) attempts to address stresses on retainers for roller clutches, but does not address the problem of reducing the axial length of the rollers. Sprag one-way clutches also suffer a similar undesirable increase in axial length for similar reasons. U.S. Pat. No. 6,953,112 (Miura) addresses problems associated with asymmetry of a frame for a sprag clutch, but does not address the problem of reducing the axial length of the clutch. Thus, roller and sprag one-way clutches increases the cost, weight, and complexity of stator 39, and subsequently, of torque converter 10. It should be understood that the preceding discussion regarding one-way clutches is applicable to applications other than a torque converter.

Thus, there is a long-felt need for a one-way clutch providing a better distribution of stress forces and having a reduced axial length.

BRIEF SUMMARY OF THE INVENTION

The present invention broadly comprises a one-way clutch including a first race circumferentially disposed about an axis for the clutch and with a first circumferential surface; a second race circumferentially disposed about the axis and with a second circumferential surface radially opposite the first circumferential surface; and at least one wedge element separate from the first and second races and disposed radially between the first and second races. The first race is arranged for rotational connection to a torque transmitting element in an automotive device and is arranged to rotate independently of the second race for rotation, with respect to the first race, in a first rotational direction. A circumference for one of the inner and outer circumferential surfaces is at a uniform radial distance from an axis for the clutch. A circumference for the other of the inner and outer circumferential surfaces includes at least one radial protrusion. For rotation of the first race with respect to the second race in a second rotational direction, opposite the first rotational direction, the at least one wedge element is arranged to engage the at least one protrusion and the one of the inner and outer circumferential surfaces to rotationally lock the first and second races. For rotational locking, a circumferential dimension of a portion of the at least one wedge element in contact with the second race is greater than an axial dimension for the portion.

The one-way clutch includes at least one resilient element connected to one of the inner and outer races and to the at least one wedge element and urging the at least one wedge element in the second rotational direction. The wedge element is rotationally independent of the first and second races.

In some aspects, a wedge circumferential surface radially opposite the one of the inner and outer circumferential surfaces is shaped to mirror the one of the inner and outer circumferential surfaces. In some aspects, the wedge circumferential surface matingly engages the one of the inner and outer circumferential surfaces during the rotational locking. In some aspects, for the rotational locking of the inner and outer races, a majority of stress produced by the at least one wedge element in the outer race is hoop stress.

In some aspects, the at least one wedge element includes a plurality of wedge elements symmetrically disposed about the axis or the at least one wedge element includes a plurality of interconnected wedge elements. The respective longitudinal axes for the first and second races are co-linear and respective longitudinal axes for the first and second races are co-linear with the axis for the clutch.

In some aspects, the outer race is rotationally fixed, the inner race is rotationally fixed, the outer race is rotatable, or the inner race is rotatable. In some aspects, the one way clutch is a stator one way clutch for a torque converter.

The present invention also broadly comprises a stator one-way clutch, including a hub arranged for rotational connection with a stator shaft and including an outer circumferential surface; an outer race circumferentially disposed about the hub and with an inner circumferential surface radially opposite the outer circumferential surface, the outer race rotatable with respect to the hub for rotation in a first rotational direction; and a plurality of wedge elements separate from the inner and outer races and disposed radially between the inner and outer races. One of the inner and outer circumferential surfaces is at a uniform radial distance from an axis for the clutch. The other of the inner and outer circumferential surfaces includes a plurality of radial protrusions. For rotation of the outer race in a second rotational direction, opposite the first rotational direction, the plurality of wedge elements is arranged to engage the plurality of protrusions and the one of the inner and outer circumferential surfaces to rotationally lock the hub and outer race. For the rotational locking, a circumferential extent of the plurality of wedge elements in contact with the hub and outer race is greater than an axial extent of the plurality of wedge elements in contact with the hub and outer race.

It is a general object of the present invention to provide a one-way clutch having a reduced axial width.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 7A:
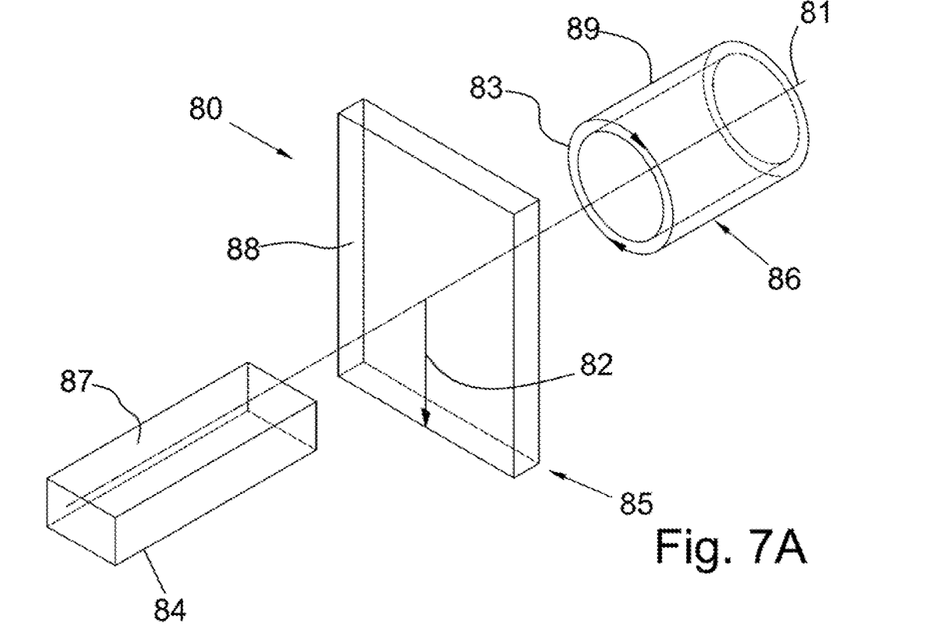
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 7B:
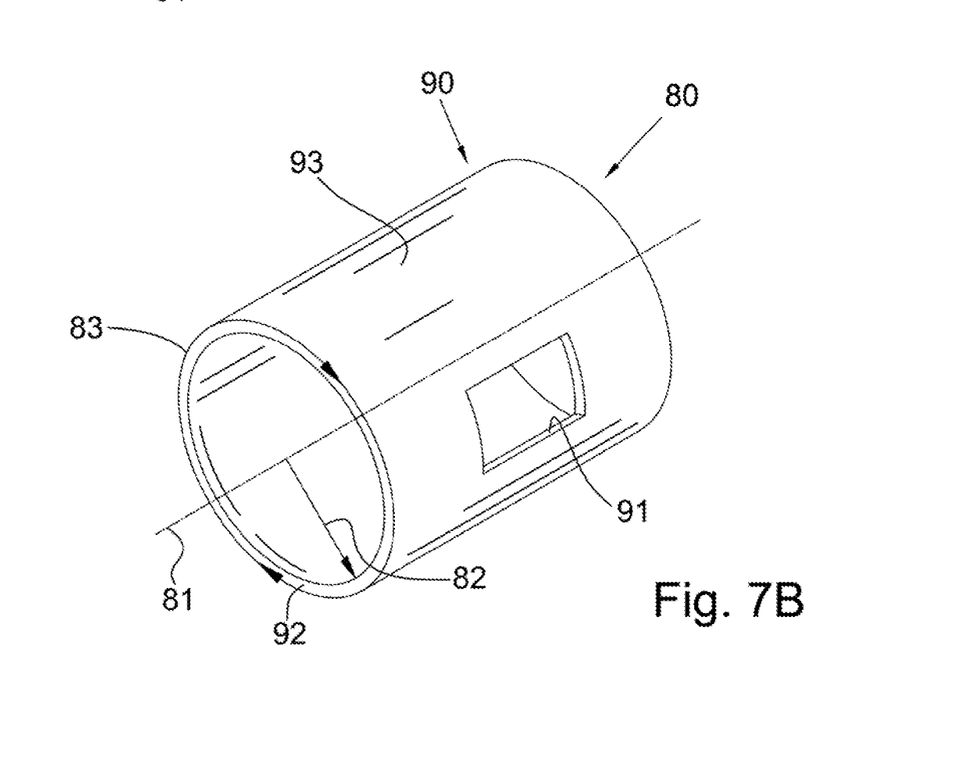
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
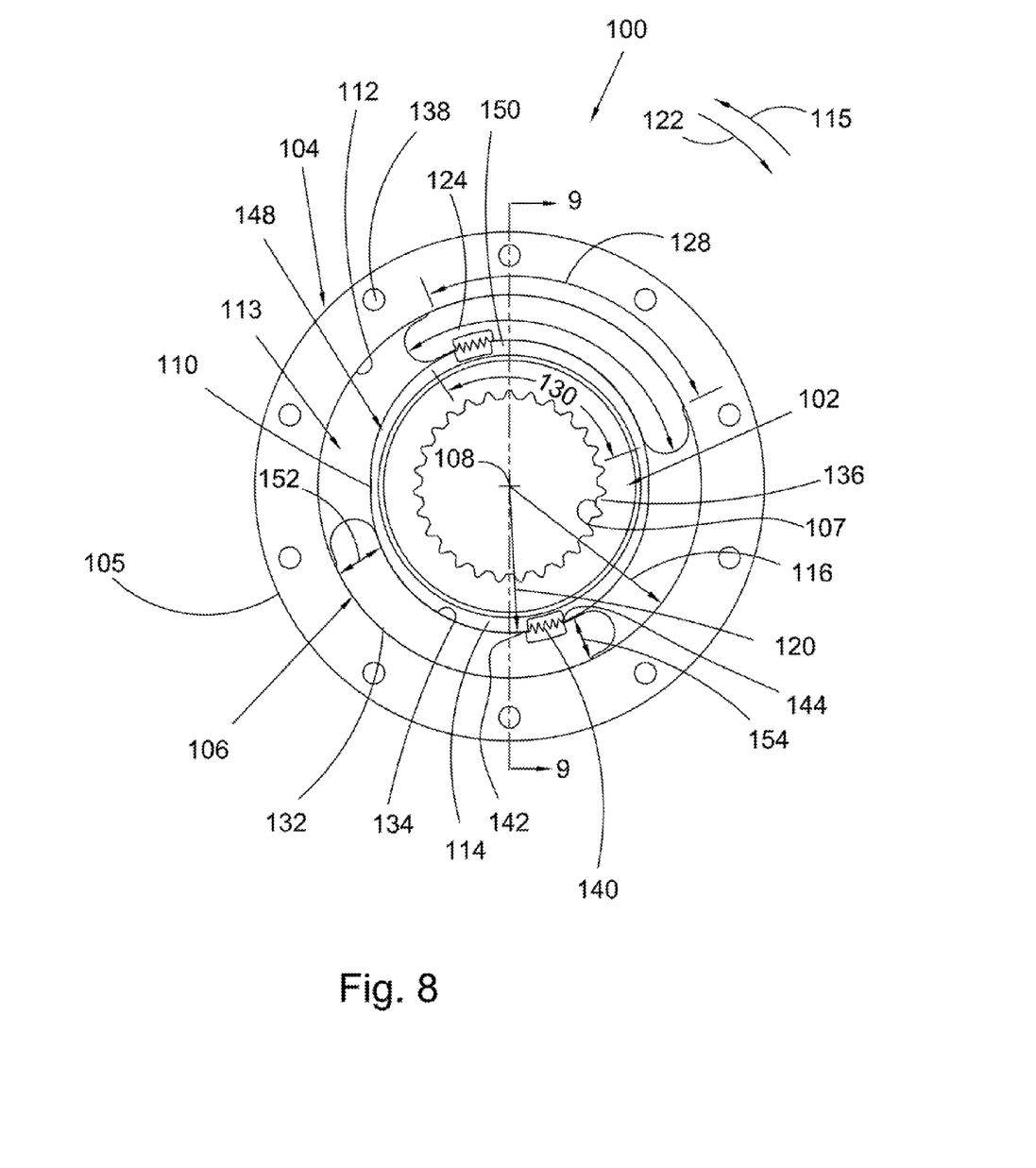
FIG. 8 is a front view of a present invention one-way clutch.

FIG. 8 is a front view of present invention one-way clutch 100.

Figure 9:
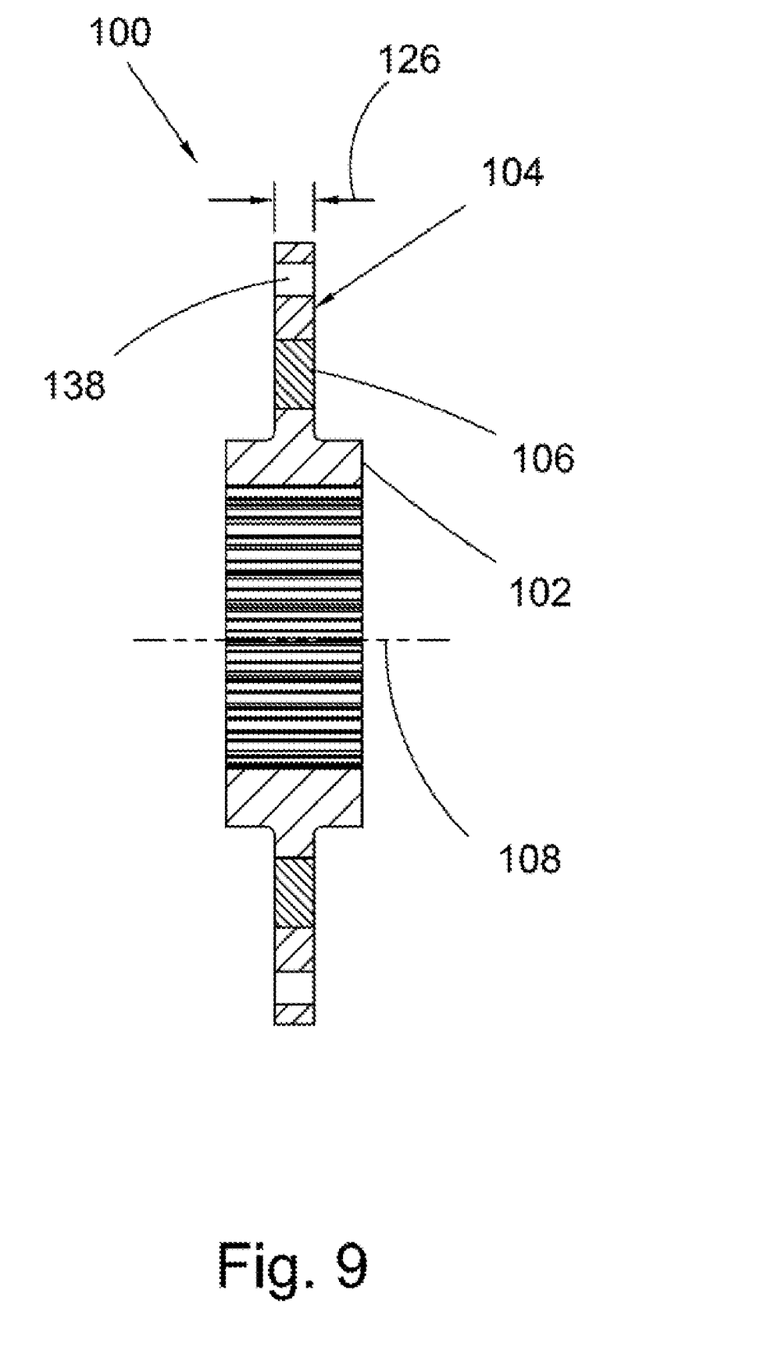
FIG. 9 is a cross sectional view of the clutch in FIG. 8 generally along line 9-9 in FIG. 8; and, FIG. 10 is a front view of a present invention one-way clutch with interconnected wedge elements.

FIG. 9 is a cross sectional view of clutch 100 in FIG. 8 generally along line 9-9 in FIG. 8. The following should be viewed in light of FIGS. 8 and 9. One-way clutch 100 includes inner race 102, outer race 104, and at least one wedge element 106. In some aspects (not shown) wedge element 106 is a single element. In some aspects, wedge element 106 is a plurality of wedge elements. Race 102 is circumferentially disposed about axis 108 for clutch 100 and includes circumferential surface 110. Race 104 also is circumferentially disposed about the axis and at least a portion of race 104 is radially aligned with race 102. Race 104 includes circumferential surface 112 radially opposite surface 110. That is, at least a portion of surfaces 110 and 112 are radially aligned. Respective longitudinal axes for the races are co-linear with each other and co-linear with axis 108. In an example, embodiment, surface 105 of race 104 forms an outer circumference for clutch 100, and surface 107 of race 102 forms an inner circumference for clutch 100.

Wedge elements, or wedges, 106 are separate from the races and disposed radially between the races in space 113. That is, the elements are formed separately from the races. The wedges are rotationally independent of the races. By this we mean that the wedges are not always rotationally locked with the races and have a degree of freedom with respect to rotation of the races. The following description assumes that the outer race (race 104) is the race connected to the torque transmitting element, however, it should be understood that the discussion applies to any configuration of the races as further described infra. For example, as further described infra, the wedges and the races are rotationally locked during lock up mode. However, during free wheel mode, the outer race rotates while the wedges are stationary. Further, during the transition between locking and free wheel modes, the wedges move up and down radial protrusions 114 on race 102.

One of races 102 and 104 is arranged for rotational connection to a torque transmitting element (not shown) in an automotive device (not shown). In FIG. 8, race 104 is arranged for connection to the torque transmitting element and this configuration is assumed for the discussion that follows unless noted otherwise. Unless noted otherwise it is assumed that configurations or characteristics referenced to race 104 are with respect to the race (race 102 or race 104) connected to the torque transmitting element. Race 104 is arranged to rotate independently of race 102, for rotation of race 104, with respect to race 102, in a rotational direction, for example, direction 115. That is, race 104 free wheels for relative rotation in direction 115. Although direction 115 is shown as counter clockwise, it should be understood that free wheeling in a present invention clutch is not limited to any particular rotational direction. In some aspects, race 102 is a hub and rotationally fixed. For example, clutch 100 is a stator clutch for a torque converter and is connected to a grounded stator shaft (not shown).

A circumference for one of surfaces 110 and 112 is at a uniform radial distance from axis 108. In some aspects, the surface for the outer race, for example, surface 112, is at a uniform radial distance. Thus, surface 112 forms a cylinder with a radius 116. Then, the circumferential surface for the other race, for example, surface 110, includes at least one radial protrusion 114. That is, radial distance 120 of the surface from axis 108 varies and is greatest at the protrusions. Alternately stated, the protrusions form respective ramps in surface 110. In some aspects (not shown) the above configuration is reversed. That is, protrusions are formed on the circumferential surface for the outer race and the circumferential surface for the inner race is radially uniform.

For rotation of race 104 in rotational direction 122, opposite direction 115, wedge elements 106 are arranged to engage surface 110, in particular, protrusions 114 and surface 112 to rotationally lock the races, as further described infra. In the configuration shown in the figures, the free-wheel direction is direction 115 and the locking direction is direction 122. However, it should be understood that clutch 100 is not limited to this configuration, for example, in some aspects, the free-wheel and locking directions are reversed from those shown in the figures.

Circumferential extent 124 of the wedges is greater than axial extent 126 of the wedges. Thus, advantageously, during rotational lock up of the races, circumferential dimensions 128 and 130 of surfaces 132 and 134, respectively, of wedges 106 in contact with races 102 and 104 are greater than axial dimension 126 of surfaces 132 and 134 in contact with races 102 and 104. Alternately stated, the circumferential extent of the wedges in contact with the races is greater than the axial extent of the wedges in contact with the races. Thus, since the configuration of wedges 106 increases the circumferential extent of contact with the races, the axial extent of elements 106 is reduced while maintaining the necessary load-bearing capacity for elements 106. Therefore, the axial extent of clutch 100 is advantageously reduced. Also, the configuration of the races and wedges results in the majority of the stress produced by the wedges on the races during lock up to be hoop stress.

In FIG. 8, clutch 100 is shown configured for connection to a torque transmitting element in the form of a torque converter stator (not shown). However, it should be understood that a present invention clutch is not limited to use with a torque converter stator and that a present convention clutch can be used with other torque transmitting elements in automotive devices. In this configuration, race 102 is a hub rotationally connected to a torque receiving element (not shown) using any means known in the art, for example, splines 136. For a torque converter stator, race 102 is connected to a fixed stator shaft.

Race 104 is rotationally connected to the torque transmitting element by any means known in the art. In some aspects, fasteners (not shown) and openings 138 are used to connect race 104 with the torque transmitting element, for example, a stator blade assembly.

It should be understood that clutch 100 is not limited to a rotationally fixed race 102 and a rotatable race 104. In some aspects, both races are rotatable and the rotation between the torque receiving race, which can be either the inner or the outer race, and the other race is a relative rotation. For example, to trigger the lock up mode, the race connected to the torque transmitting element rotates more rapidly in the lock up direction than the other race. In some aspects, race 102 is arranged for connection to a torque transmitting element and race 104 is fixed.

The operation of clutch 100 is now explained in further detail. In general, the change in position of elements 106 between the free-wheel and locking modes is relatively small. Therefore, FIG. 8 is used to show and describe both modes. Alternately stated, there is little movement of elements 106 between the free-wheel and locking modes. Thus, the amount of lash associated with a shift between modes is advantageously reduced.

Converter 100 includes at least one elastically deformable segment, or resilient element, 140. Specifically, a respective segment is connected to, or engaged with, each wedge and with one of the races. Elements 140 urge the wedges in the lock-up direction, for example, direction 115. In FIG. 8, the segments include end 142 engaged with race 102 and end 144 engaged with the wedges. The segments react against race 102 to bias segments 140. The biasing of the segments causes the wedges to remain at least nominally in contact with race 104 during free wheel mode. Thus, when race 104 reverses direction for the lock up mode, force from the race is immediately transferred to the wedges facilitating the shifting of the wedge and reducing lash. Elements 140 can be any resilient element known in the art, for example, compressive springs, extension springs, or formed sheet metal.

In general, surfaces 110 and 112 and surfaces 132 and 134 are shaped to enable free wheeling of race 104 in the free-wheel direction and locking of the inner and outer race in the locking direction. In general, the respective opposing surfaces in contact are complimentarily formed. For example, surface 132 of wedges 106 forms a wedge circumferential surface radially opposite surface 112. In general, the wedge circumferential surface is radially opposite the race circumferential surface having a uniform radius. The wedge circumferential surface is shaped to mirror surface 112. Thus, the wedge circumferential surface matingly engages surface 112 during said rotational locking. By matingly engage, we mean that there is substantially full contact between the surfaces.

Ramps 114 radially increase from foot 148 to top 150. Therefore space 113 radially decreases between the foot and the top. In some aspects, wedges 106 are formed to compliment this space. For example, radial width 152 is larger than radial width 154. That is, the wedges circumferentially taper in direction 115.

In locking mode, surfaces 110 and 112 and surfaces 134 and 132 are jammed together due to the configuration of the respective surfaces and the wedges. Alternately stated, respective opposing surfaces are compressively engaged, or frictionally locked, together. To move from the lock up mode to the free wheel mode, race 104 begins to rotate in direction 122. Friction between surface 112 and the wedges causes the wedges to slide in direction 122. Since ramps 114 are sloped radially from top 150 inward in direction 122, and space 113 radially increases in direction 122, the movement of the wedges shifts the wedges to a portion of space 113 having a larger radial width than the wedges, relieving the compressive engagement of the wedges and races. Alternately stated, the relative rotation of the outer race with respect to the inner race enables the wedges to slide with respect to surfaces 110 and 112. For example, wedges 106 slide on the ramps, and radial space is created between segments 106 and the races. Thus, race 104 is able to rotate with respect to race 102. Elements 140 urge the wedges in direction 115, therefore, during free wheel, some contact remains between the wedges and surface 112 during free wheel.

To shift from free wheel to locking mode, race 104 reverses direction to rotate in direction 115. The wedges maintain at least nominal frictional contact with the races during free wheel, therefore, the rotation of race 104 in direction 115 frictionally locks surface 112 and the wedges and "drags" the wedges in the same direction. Thus, the relative motion of race 104 with respect to race 102 causes wedges 106 to slide with respect to surface 110. That is, wedges 106 ride on respective ramps 114 into respective portions of space 113 with decreasing radial width, rotationally locking the wedges and races.

Figure 10:
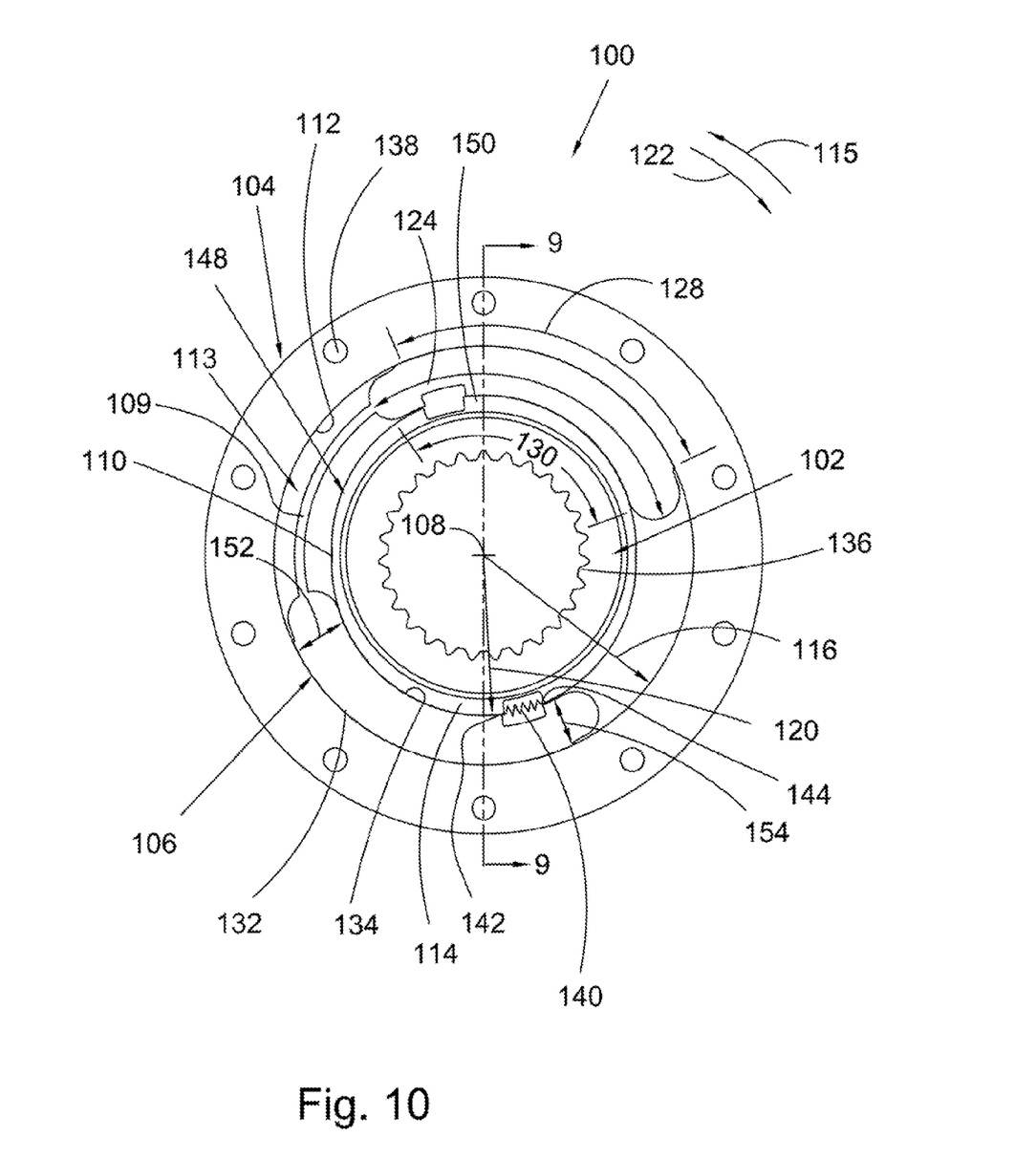

FIG. 10 is a front view of a present invention one-way clutch with interconnected wedge elements. In general, to evenly distribute hoop stress and other forces associated with the locking mode, the wedges are symmetrically disposed, for example, symmetrically disposed about axis 108. However, it should be understood that the wedges also can be asymmetrically disposed as well. In some aspects, components of clutch 100 are formed by stamping. For example, the races and the wedges can be formed by stamping. In some aspects, a plurality of wedges 106 are interconnected. For example, the wedges are stamped from a same piece of material and joined by strip 107. In some aspects, for example, when the wedges are interconnected, a single resilient element 140 is used. In some aspects, (not shown), a combination of individual and interconnected wedges is used in clutch 100.

Clutch 100 is shown with two wedges 106, however, it should be understood that clutch 100 is not limited to a specific number of wedges. For example, clutch 100 can have a single wedge or more than two wedges. The number of wedges used can be determined according to the desired torque capacity of the automotive device using the clutch and manufacturing considerations, for example, selecting an optimal thickness of the clutch element with respect to a particular fabricating process. For example, in some aspects, the clutch elements are formed by stamping and the thickness of the clutch elements can be determined to accommodate the stamping equipment used. Specifically, if the clutch is used in a torque converter stator, the number of clutch elements used in the clutch could be increased as the power of the engine for the vehicle housing the torque converter increases and vise versa.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A one-way clutch, comprising:
a first race circumferentially disposed about an axis for said clutch, and with a first circumferential surface, wherein for at least a portion of the first race a single first piece of material forms the first circumferential surface and one of an inner or outer circumference for the one-way clutch;
a second race circumferentially disposed about said axis and with a second circumferential surface radially opposite said first circumferential surface, wherein for at least a portion of the second race a single second piece of material forms the second circumferential surface and the other of the inner or outer circumference for the one-way clutch; and,
at least one wedge element separate from said first and second races and disposed radially between said first and second races, wherein said first race is arranged for rotational connection to a torque transmitting element in an automotive device and is arranged to rotate independently of said second race for rotation, with respect to said first race, in a first rotational direction, wherein a circumference for one of said first or second circumferential surfaces is at a uniform radial distance from an axis for said clutch, wherein a circumference for an other of said first or second circumferential surfaces includes at least one radial protrusion, wherein for rotation of said first race with respect to said second race in a second rotational direction, opposite said first rotational direction, said at least one wedge element is arranged to contact said at least one protrusion and said one of said first or second circumferential surfaces to rotationally lock said first and second races, and wherein for said rotational locking, a circumferential dimension of a portion of said at least one wedge element in contact with said second race is greater than an axial dimension for said portion.

2. The one-way clutch of claim 1 further comprising at least one resilient element connected to one of said first and second races and to said at least one wedge element and urging said at least one wedge element in said second rotational direction.

3. The one-way clutch of claim 1 wherein one of the first or second races is rotationally independent of said at least one wedge element in the first rotational direction.

4. The one-way clutch of claim 1 wherein said at least one wedge element comprises a wedge circumferential surface radially opposite said one of said first or second circumferential surfaces and shaped to mirror said one of said first or second circumferential surfaces.

5. The one-way clutch of claim 4 wherein said wedge circumferential surface matingly engages said one of said first or second circumferential surfaces during said rotational locking.

6. The one-way clutch of claim 1 wherein for said rotational locking of said inner and outer races, a majority of stress produced by said at least one wedge element in said outer race is hoop stress.

7. The one-way clutch of claim 1 wherein said at least one wedge element comprises a plurality of wedge elements symmetrically disposed about said axis.

8. The one-way clutch of claim 1 wherein said at least one wedge element comprises a plurality of interconnected wedge elements.

9. The one-way clutch of claim 1 wherein respective longitudinal axes for said first and second races are co-linear.

10. The one-way clutch of claim 1 wherein respective longitudinal axes for said first and second races are co-linear with said axis for said clutch.

11. The one-way clutch of claim 1 wherein said first race is rotationally fixed.

12. The one-way clutch of claim 1 wherein said second race is rotationally fixed.

13. The one-way clutch of claim 1 wherein said first race is rotatable.

14. The one-way clutch of claim 1 wherein said second race is rotatable.

15. The one-way clutch of claim 1 wherein said clutch is a one way clutch for a stator in a torque converter.

16. A one-way clutch, comprising:
a first race circumferentially disposed about an axis for said clutch and with a first circumferential surface;

a second race circumferentially disposed about said axis, disposed radially inward of the first race, and with a second circumferential surface radially opposite said first circumferential surface;

at least one wedge element separate from said first and second races, disposed radially between said first and second races; and, at least one resilient element connected to one of said inner and outer races and to said at least one wedge element and urging said at least one wedge element in a first rotational direction, wherein said first race is arranged for rotational connection to a torque transmitting element in an automotive device and is arranged to rotate independently of said second race for rotation, with respect to said first race, in a second rotational direction, opposite said first rotational direction, wherein a circumference for said first circumferential surface is at a uniform radial distance from an axis for said clutch, wherein a circumference for said second circumferential surface includes at least one radial protrusion, wherein for rotation of said first race with respect to said second race in the first rotational direction, said at least one wedge element is arranged to engage said at least one protrusion and said first circumferential surface to rotationally lock said first and second races, wherein for said rotational locking, a circumferential dimension of a portion of said at least one wedge element in contact with said second race is greater than an axial dimension for said portion, wherein said at least one wedge element comprises a wedge circumferential surface radially opposite said first circumferential surface and arranged to matingly engage said first circumferential surface during said rotational locking, and wherein one of the first or second races is rotationally independent of said at least one wedge element in the first rotational direction.

17. A stator one-way clutch, comprising:

a hub arranged for rotational connection with a stator shaft and including an outer circumferential surface, wherein for at least a portion of the hub a single first piece of material forms the outer circumferential surface and one of an inner or outer circumference for the one-way clutch;

an outer race circumferentially disposed about said hub and with an inner circumferential surface radially opposite said outer circumferential surface, said outer race rotatable with respect to said hub for rotation in a first rotational direction, wherein for at least a portion of the outer race a single second piece of material forms the inner circumferential surface and the other of the inner or outer circumference for the one-way clutch; and, a plurality of wedge elements separate from said hub and said outer race and disposed radially between said hub and said outer race, wherein one of said inner or outer circumferential surfaces is at a uniform radial distance from an axis for said clutch, wherein an other of said inner or outer circumferential surfaces includes a plurality of radial protrusions, wherein for rotation of said outer race in a second rotational direction, opposite said first rotational direction, said plurality of wedge elements is arranged to contact said plurality of protrusions and said one of said inner or outer circumferential surfaces to rotationally lock said hub and outer race, and wherein for said rotational locking, a circumferential extent of said plurality of wedge elements in contact with said hub and outer race is greater than an axial extent of said plurality of wedge elements in contact with said hub and outer race.

18. The one-way clutch of claim 17 further comprising at least one resilient element connected to one of said hub or said outer race and to said at least one wedge element and urging said at least one wedge element in said second rotational direction.

19. The one-way clutch of claim 17 wherein one of the hub or the outer race is rotationally independent of said at least one wedge element.

20. The one-way clutch of claim 17 wherein said at least one wedge element comprises a wedge circumferential surface radially opposite said one of said inner or outer circumferential surfaces and shaped to mirror said one of said inner or outer circumferential surfaces and wherein said wedge circumferential surface matingly engages said one of said inner or outer circumferential surfaces during said rotational locking.

21. The one-way clutch of claim 17 wherein said at least one wedge element comprises a plurality of wedge elements symmetrically disposed about said axis.

22. The one-way clutch of claim 17 wherein respective longitudinal axes for said first and second races are co-linear with said axis for said clutch.

23. A stator one-way clutch, comprising:

a hub arranged for rotational connection with a stator shaft and including an inner circumferential surface;

an outer race circumferentially disposed about said hub, disposed radially outward of the hub, and with an inner circumferential surface radially opposite said outer circumferential surface, said outer race rotatable with respect to said hub in a first rotational direction;

at least one wedge element separate from said hub and said outer race, disposed radially between said hub and said outer race; and, at least one resilient element connected to one of said hub and said outer race and to said at least one wedge element and urging said at least one wedge element in a second rotational direction, opposite said first rotational direction, wherein a circumference for said outer circumferential surface is at a uniform radial distance from an axis for said clutch, wherein a circumference for said inner circumferential surface includes at least one radial protrusion, wherein for rotation of said outer race in said second rotational direction, said at least one wedge element is arranged to engage said at least one protrusion and said outer circumferential surface to rotationally lock said hub and outer race, wherein for said rotational locking, a circumferential extent of said plurality of wedge elements in contact with said hub and outer race is greater than an axial extent of said plurality of wedge elements in contact with said hub and outer race, wherein said at least one wedge element comprises a wedge circumferential surface radially opposite said inner circumferential surface and arranged to mirror said inner circumferential surface, and wherein one of the hub or the outer race is rotationally independent of said at least one wedge element in the first rotational direction.

* * * * *